United States Patent
Sauer (10) Patent No.: US 10,221,996 B2
(45) Date of Patent: Mar. 5, 2019

(54) STEAM TRAP, ASEPTIC DOUBLE SEATED VALVE, METHOD OF OPERATING THE STEAM TRAP, AND FILLING PLANT

(71) Applicant: EVOGUARD GMBH, Nittenau (DE)

(72) Inventor: Martin Sauer, Kaisheim (DE)

(73) Assignee: Evoguard GmbH, Nittenau (DE)

( * ) Notice: Subject to any disclaimer, the term of this patent is extended or adjusted under 35 U.S.C. 154(b) by 0 days.

(21) Appl. No.: 15/448,480

(22) Filed: Mar. 2, 2017

(65) Prior Publication Data
US 2017/0254474 A1    Sep. 7, 2017

(30) Foreign Application Priority Data
Mar. 3, 2016  (DE) .................. 10 2016 203 557

(51) Int. Cl.
| | |
|---|---|
| F16K 1/44 | (2006.01) |
| F16T 1/02 | (2006.01) |
| F16K 1/38 | (2006.01) |
| F16K 25/00 | (2006.01) |
| F16T 1/38 | (2006.01) |

(52) U.S. Cl.
CPC .............. *F16T 1/02* (2013.01); *F16K 1/385* (2013.01); *F16K 1/446* (2013.01); *F16K 25/00* (2013.01); *F16T 1/383* (2013.01)

(58) Field of Classification Search
CPC .. F16T 1/02; F16T 1/383; F16K 1/446; F16K 25/00; F16K 1/38; F16K 1/385; F16K 39/02; F16K 39/022
USPC ................................. 251/119–122
See application file for complete search history.

(56) References Cited

U.S. PATENT DOCUMENTS

| | | | | |
|---|---|---|---|---|
| 4,434,965 A | * | 3/1984 | St Martin, Jr. | ......... F16K 47/04 251/121 |
| 5,628,339 A | | 5/1997 | Isringhausen | |
| 6,056,003 A | * | 5/2000 | Madsen | ................. F16K 1/446 137/240 |
| 6,609,697 B2 | * | 8/2003 | Gsteu | ....................... F16K 3/34 137/625.3 |
| 9,121,516 B2 | * | 9/2015 | Sauer | ..................... F16K 1/446 |

(Continued)

FOREIGN PATENT DOCUMENTS

| | | |
|---|---|---|
| DE | 1711575 U | 11/1955 |
| DE | 4036581 A1 | 8/1991 |

(Continued)

OTHER PUBLICATIONS

Machine Translation for DE202011102059U1.*

*Primary Examiner* — Ian Paquette
(74) *Attorney, Agent, or Firm* — McCoy Russell LLP (57) ABSTRACT

In a steam trap comprising a seat valve that is adapted to be switched over between an open position for a first discharge state with large throughput and a closed position for a second discharge state with small throughput, the closure element and the seat of the seat valve define, at the closed position, a two-part passage, said passage having a jet cross-section, which first decreases in size in the discharge direction and, subsequently, re-increases in size, and being delimited by the seating area, the sealing face and at least one, only local control groove in the sealing face and/or the seating area. In the aseptic double seated valve the steam trap serves to carry out a flushing cycle as well as a sterilization cycle in a filling plant.

19 Claims, 5 Drawing Sheets

(56) References Cited

U.S. PATENT DOCUMENTS

| | | | |
|---|---|---|---|
| 9,416,879 B2* | 8/2016 | Fath | F16K 1/443 |
| 9,863,540 B2* | 1/2018 | Hagnauer | F16K 1/446 |
| 2007/0151611 A1 | 7/2007 | Deger | |
| 2015/0211642 A1 | 7/2015 | Burmester et al. | |
| 2016/0258539 A1* | 9/2016 | Langenegger | F16K 1/446 |
| 2017/0022841 A1* | 1/2017 | Nakamura | F01D 17/10 |

FOREIGN PATENT DOCUMENTS

| | | | |
|---|---|---|---|
| DE | 202011102059 U1 * | 11/2011 | F16K 1/446 |
| DE | 102011050955 A1 | 12/2012 | |
| EP | 0545846 A1 | 6/1993 | |
| WO | 2012168221 A2 | 12/2012 | |
| WO | 2015039724 A1 | 3/2015 | |

* cited by examiner

STEAM TRAP, ASEPTIC DOUBLE SEATED VALVE, METHOD OF OPERATING THE STEAM TRAP, AND FILLING PLANT

CROSS-REFERENCE TO RELATED APPLICATION

The present application claims priority to German Patent Application No. 10 2016 203 557.6, entitled "Steam Trap, Aseptic Double Seated Valve, Method of Operating the Steam Trap, and Filling Plant," filed on Mar. 3, 2016, the entire contents of which are hereby incorporated by reference for all purposes.

TECHNICAL FIELD

The present disclosure relates to a steam trap device and system including an aseptic double seated valve, a filling plant, and a method for operating the steam trap.

BACKGROUND AND SUMMARY

In a steam trap of a double seated valve known from WO 2012/168221 A2, the closure body comprises, subsequent to the conical sealing face, a cylindrical extension which, at the open position as well as at the closed position, engages a hollow-cylindrical extension of the seat and delimits therein a circular passage. The size of the passage remains unchanged during displacements of the closure element and limits a predetermined flow rate. The closure element is adapted to be displaced up to and into full shut-off contact with the seat. At the open position of the seat valve, the cleaning medium is discharged. At the closed position, the steam pressure is maintained until the seat valve is, depending on the respective temperature, displaced to the open position so as to discharge the accruing condensate. The steam trap is connected to a lower shut-off valve of a valve chamber of a double seated valve, said valve chamber being cleaned and sterilized with sterile steam. The condensate resulting from the application of steam is here discharged at the open position of the seat valve, which, depending on the prevailing temperature, is maintained at the fully sealing, closed position as long as no condensate occurs.

In a steam trap, which is known from WO 2015/039724 A1 and which is connected to a condensate line that branches off from a piping arrangement of a processing system, the closure element arranged upstream of the seat, when seen in the direction of discharge, is adapted to be displaced by means of a thermodynamic actuator and/or a pneumatic actuating means relative to the seat between a sealing closed position, a throttling partially closed position and a fully open position.

DE 4036581 A1 discloses a steam trap, which, via a switchover valve, is connected to the discharge valve of a double seated valve. The switchover valve opens, during the flushing cycle, a path having a large cross-section and leading to the outlet, while the steam trap is isolated.

U.S. Pat. No. 5,628,339 A discloses a steam trap connected to the steam line of a hot-water boiler and comprising a passage in a valve screw insert.

DE 1711575 U discloses a steam trap for steam heatings, in the case of which a closure element having a frustoconical shape or the shape of a circular cylinder is provided with grooves in the circumferential surface, said grooves defining constant cross-sections without any jet effect in the direction of discharge.

It is the object of the present disclosure to provide a steam trap, an aseptic double seated valve, a method of operating the steam trap and a filling plant, which are reliable in function, cost-efficient and which require little maintenance, with the steam trap comprising the least possible number of components and allowing a reduction of the constructional outlay in an aseptic double seated valve.

At the closed position, a jetlike passage is kept open in the steam trap by the closure element and the seat, so that the steam trap operates according to the advantageous principle of a jet-type steam trap. Accruing condensate is permanently discharged via the passage, while the steam pressure is largely maintained. This is important for the efficiency of the sterilization cycle. At the open position, the seat valve opens a large cross-section, which corresponds to the passage of the drain valve and which, in the first discharge state, allows the large throughput of condensate and product residues. The large throughput as well as the small throughput are discharged via the same path, so that it is no longer necessary to provide a conventional switchover valve and the piping required thereof, which discharges only the small throughput into the steam trap, but which, bypassing the steam trap, discharges the large throughput into the outlet. The passage, which, in the discharge direction, is first narrow and increases in width subsequently and which acts as a diffusor from the physical point of view, generates a counterpressure due to the evaporation of the superheated condensate and the expansion of the resultant steam, said counterpressure controlling the amount of condensate flowing through and, consequently, the steam pressure on the sterilization side is maintained almost constant. Cold condensate, which accumulated in the system, is discharged more quickly via the passage, since the latter is effective without the re-evaporation effect. The space required for the steam trap and for installing the latter on the aseptic double seated valve is reduced. The steam trap consists of a small number of components and, in view of said small number of components, it is cost-efficient and requires little maintenance, since, when in operation, it will be self-cleaning. When the large throughput is discharged via the seat valve at the open position, the then exposed passage will be cleaned reliably, whereby a clogged passage will be avoided at the closed position. If the passage should tend to clog during the sterilization cycle, it will be possible to carry out automated cleaning via a control by temporarily displacing the closure element to the open position or in the direction of the open position, so that deposits on the components of the passage will be flushed away. The steam trap is extremely robust and hard-wearing. The use of seals acted upon by pressure can be dispensed with, since shaft seals that may possibly be provided on the actuator only have to seal off an almost pressureless rear space. Due to the simple structural design of the steam trap, servicing of the latter will easily be possible at any time.

In the case of the aseptic double seated valve provided with the steam trap, the large throughput of condensate and product residues will, during a flushing cycle, be conducted to the outlet via the same path in the steam trap as the small throughput of condensate resulting from the steam applied, so that a normally provided switchover valve with complex piping will no longer be necessary and the aseptic double seated valve will require little maintenance due to effective self-cleaning of the seat valve in the steam trap.

According to an expedient embodiment of the steam trap, the sealing face and the seating area either have identical cone top angles, or the sealing face has a very small width and is increased in width as a receding area through a subsequent smaller cone top angle, whereby a gap increasing in width is formed between the sealing face and the seating area. In the first case, a large-area contact region is created at the closed position, in which the contour for the passage is incorporated either in the seating area or in the sealing face. In the second case, the contact created is substantially a line contact, interrupted by the contour of the passage. The passage area which increases in width subsequent to the constriction is here defined by the sealing face and the seating area which open at an acute angle.

According to an expedient embodiment, the seat increases in width from the intake side in the discharge direction so as to form a valve chamber leading to the outlet. The closure element is adapted to be moved, on a linear actuator extending through the valve chamber, relative to the seat to the open position into the valve chamber and to the closed position out of the valve chamber and into the seat. In this way, the flow-through resistance is extremely low at the open position of the seat valve, as is desirable for the large throughput. The closure element is, however, moved to the closed position against the flow in the discharge direction, whereby the path can be narrowed gradually, with the exception of the passage that allows a flow to pass. The linear actuator is driven e.g. pneumatically, electrically or electromagnetically. The cone top angle of the seat is an angle of approximately 30° to 60°, and in one embodiment, an angle of approximately 40°. These angles allow the flow to expand freely into the valve chamber in the case of a large throughput.

According to the embodiment having differing cone top angles, these cone top angles should differ by approximately 1° to 10°. This is the angular difference with which the passage increases in width from the constriction onwards.

The axial length of the sealing face and/or the seating area may correspond to approximately 50% of the smallest seat diameter. Thus, the passage has an optimum great length that may be advantageous with respect to good flow conditions.

According to an expedient embodiment with differing cone top angles, the constriction may be created by a cylindrical milled-out portion in the area of the seat, which is easy to produce from the point of view of production technology and which can also easily be measured. The milled-out portion extends at the intake side over part of the height of the seating area and the sealing face. The area increasing in width from the constriction onwards is defined by the angular difference between the sealing face and the seating area.

According to an embodiment having identical cone top angles, however, the passage extends over the entire height of the sealing face and/or the seating area. When seen in the discharge direction, the passage begins with a cylindrical portion and increases in width conically subsequent to said cylindrical portion.

A reduction of width at the inlet of the passage can be dispensed with in the case of both embodiments, since the fluidic efficiency of the passage is not of importance.

It is definitely possible to provide a plurality of milled-out portions in the circumferential direction.

According to the embodiment in which parts of the passage are arranged in an approximately mirror-inverted manner in the seating area as well as in the sealing face, these parts are oriented relative to one another as a pair in the circumferential direction. To this end, the closure element may be protected against rotation relative to the seat.

According to an expedient embodiment, the linear actuator is a piston rod of a piston, which is adapted to be acted upon by pressurized fluid against the force of a spring, said piston rod being displaceable such that it is sealed off from the valve chamber. The piston is here may be acted upon by a spring force in the direction of adjustment of the seat valve to the open position, so that the seat valve will maintain the open position without any application of pressurized fluid to the piston. At the state of rest, the steam trap is so to speak in a standby condition ready for the large throughput. The closed position is only adjusted, e.g. by applying pressurized air, when a sterilization cycle is initiated. The closure element may alternatively be displaced in both directions by means of a linear drive. When the flushing cycle with large throughput is carried out, the parts of the passage will always be flushed and efficiently cleaned. If the passage should clog during a sterilization cycle at the closed position, this can be detected by means of a temperature detector, which e.g. detects the temperature at the intake side or in a leakage chamber of the double seated valve or in the vicinity of the steam trap. Subsequently, the seat valve may be transferred to the open position at least once more, so that the clogged passage will be cleaned by backed-up condensate which will then flow off rapidly and dynamically.

In the case of the aseptic double seated valve, it will be expedient when an intake side or the housing and/or the discharge path to the seat valve of the steam trap are provided with at least one installed temperature detector, which, acting as a temperature measuring unit, detects the temperature conditions in this area, so that it will then also be possible to switch the seat valve between the open and closed positions in a temperature-dependent manner.

One embodiment of the aseptic double seated valve has a leakage chamber in the housing, said leakage chamber having connected thereto the check valve and the drain valve for the purpose of flushing with condensate and sterilizing with steam. Possibly existing product residues are flushed away from the leakage chamber via the steam trap with large throughput, prior to executing subsequently a sterilization cycle with steam, during which the seat valve is at the closed position, but accruing condensate is discharged with small throughput via the passage that allows a flow to pass.

In the sense of a carry over part philosophy, which allows the use of many identical parts and seals, the check valve, the drain valve and the seat valve of the steam trap may, at least substantially, be identical in construction.

The concept of the steam trap allows the latter to be installed e.g. in a filling plant at a double seated valve either with a substantially horizontal valve axis or a substantially vertical valve axis, e.g. in adaptation to the respective installation space available.

BRIEF DESCRIPTION OF THE FIGURES

Embodiments of the subject matter of the present disclosure are explained making reference to the drawings, in which.

DETAILED DESCRIPTION

Figure 1:
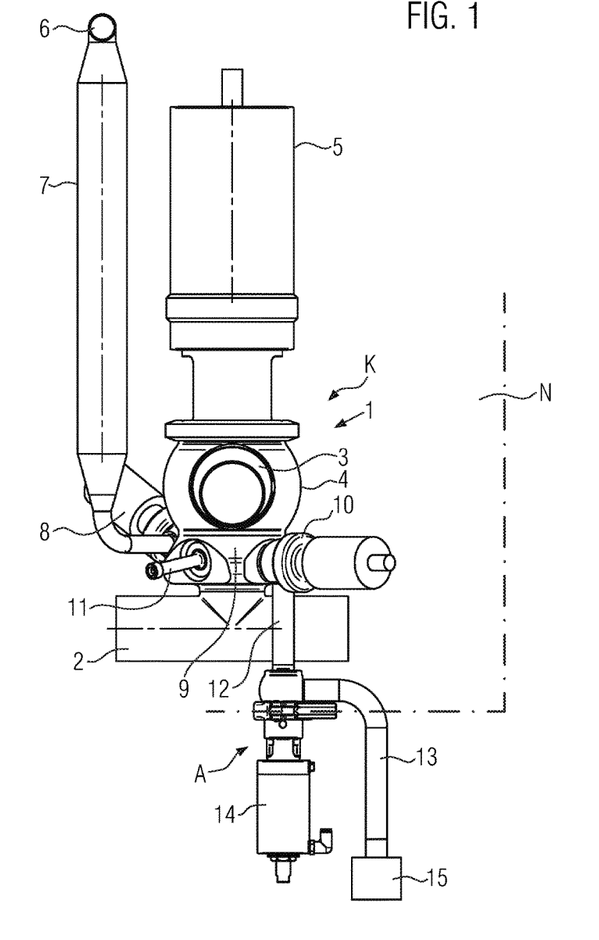
FIG. 1 shows a side view of an aseptic double seated valve provided with a steam trap, said steam trap occupying a specific installation position.
Figure 2:
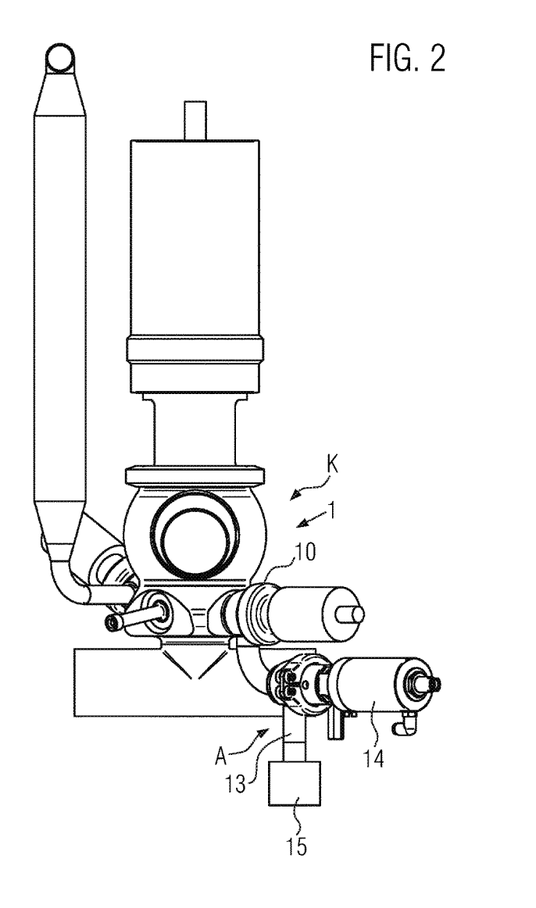
FIG. 2 shows a view similar to that of FIG. 1 with a different installation position of the steam trap.

FIGS. 1 and 2 show, as a non-limiting example, the use of a steam trap A at a so-called product node K, e.g. a filling plant N for beverages or liquid food in the food and beverage industry.

The product node K comprises an aseptic double seated valve 1, which establishes a connection between product lines 2, 3, or which separates the product lines from one another. The double seated valve 1 comprises a housing 4, and an actuating device 5. The housing 4, in which a leakage chamber 9 is provided between valve disks and seats that are not shown, has connected thereto a steam pipe 6 via a condensate bottle 7 and a check valve 8, so as to clean at least the leakage chamber 9 from product residues by means of condensate from the condensate bottle 7, and sterilize it subsequently by means of steam.

The housing 4 has additionally connected thereto a drain valve 10 from which a connection line 12 leads to the steam trap A, which, via a line 13 having the function of an outlet, may be connected to an impact absorber 15. The steam trap A has attached thereto an actuating unit 14, which is here e.g. a pneumatic actuating unit, as a linear actuator, as is also the case with the check valve 8 and the drain valve 10 in a similar way. As shown, the housing 4 has installed thereon a temperature detector 11, which detects the temperature e.g. in the leakage chamber 9, or a further temperature detector (not shown) is provided in the flow path to the steam trap A or within the steam trap A.

The product nodes K according to FIGS. 1 and 2 differ from one another with respect to different installation positions of the steam trap A, e.g. with regard to the installation space available. In FIG. 1, the steam trap is installed such that it is oriented vertically in a filling plant N, whereas in FIG. 2 it is oriented substantially horizontally.

When the product lines 2, 3 are separated from one another and when the check valve 8 is open and the drain valve 10 closed, the steam trap A is at an open position for a first discharge state with a large throughput of condensate, e.g. from the condensate bottle 7, and of product residues in the discharge direction R, or at a closed position for a second discharge state with a small throughput, for example, of condensate. These discharge states correspond to a flushing cycle and a sterilization cycle, here e.g. of the leakage chamber 9. Both discharge states make use of the same path.

Figure 3:
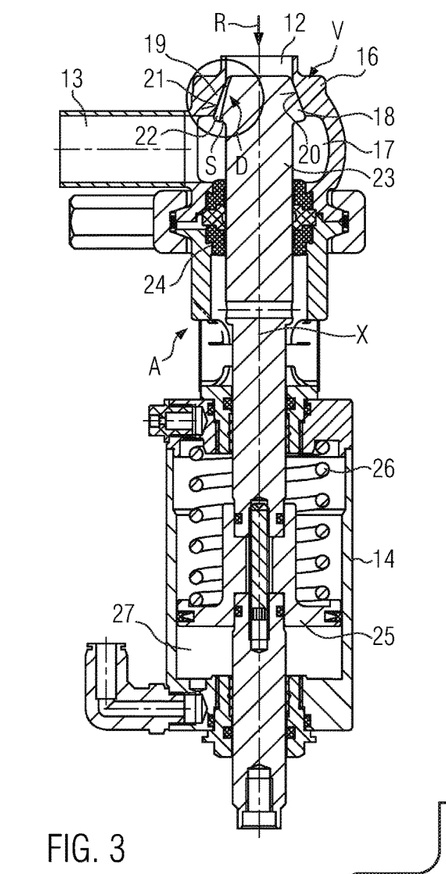
FIG. 3 shows an axial section of the steam trap according to a FIG. 1 and FIG. 2, at a closed position.
Figure 4:
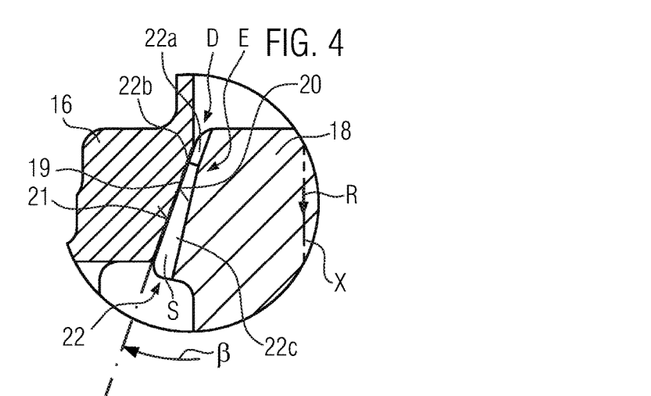
FIG. 4 shows an enlarged detail according to FIG. 3.
Figure 5:
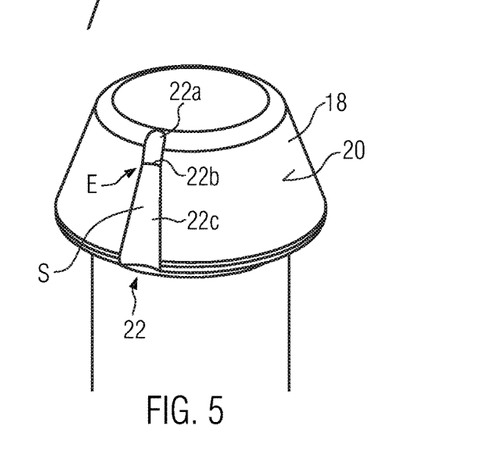
FIG. 5 shows a perspective detail view related to FIG. 3 and FIG. 4.

FIGS. 3 to 5 show an embodiment of the steam trap A, which is at the closed position in FIGS. 3 and 4.

The steam trap A in FIG. 3 comprises a housing 16 delimiting a valve chamber 17 and comprising a seat 19 with a conical seating area 21 for a conical sealing face 20 of a closure element 18, i.e. a seat valve V with a valve axis X. The seat 19 increases in width in the discharge direction R towards the valve chamber 17, which is connected to the outlet 13. At the closed position shown, the closure element 18 extends substantially fully into the seat 19 from below, so that the sealing face 20 and the seating area 21 as a seat valve would sealingly shut off the passage through the seat 19.

However, the closure element 18 and the seat 19 define with at least one control groove S a two-part passage D at the closed position. In the present embodiment, the sealing face 20 has formed therein at least one local control groove S, e.g. in the form of a milled-out portion 22, which, even at the closed position, keeps open a throttled passage through the seat 19. The cross-section of the passage D changes in the discharge direction R, insofar as it exhibits, after an initial inlet, a constriction E and subsequently increases in width in the discharge direction R.

Figure 7:
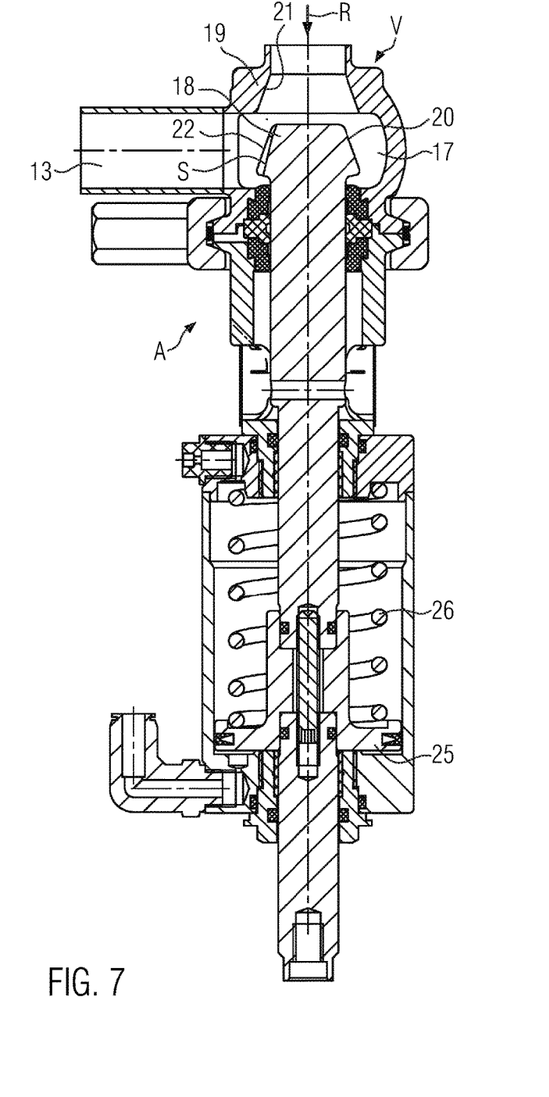
FIG. 7 shows the steam trap according to FIG. 3 to FIG. 5, at an open position.

The closure element 18 is arranged, so to speak as a head, on a linear actuator 23, and may be formed integrally with said linear actuator 23, which is a piston rod of a piston 25 that is displaceable within the actuating unit 14. The piston 25 is adapted to be acted upon by a pressure fluid in a chamber 27, so as to adjust the closed position shown, and in the opposite direction it is acted upon by the spring force of a spring 26, which adjusts the open position of the seat valve V (FIG. 7). The actuator 23 is sealed off from the valve chamber 17 by means of a seal 24.

In the enlarged representation according to FIG. 4, it can be seen that the milled-out portion 22 or control groove S in the sealing face 20 extends, in the discharge direction R, first cylindrically in an initial portion 22a approximately up to a control groove end 22b at the constriction E and subsequently increases in width in an end portion 22c.

FIG. 5 illustrates the portions 22a, 22b, 22c of the milled-out portion 22, which define the control groove S in the sealing face 20 of the closure element 18 and which form together with the seating area 21 the two-part passage D. The cylindrical milled-out portion 22 has a cylinder axis which encloses an acute angle with the conical seating area 21 or the conical sealing face 20, so that the milled-out portion 22 in the sealing face 20 or the seating area 21 is conical in shape.

According to the embodiment shown in FIGS. 3 and 4, the seating area 21 and the sealing face 20 have the same cone top angle β, which may be an angle between 30° and 60°, and in at least one example, an angle of approximately 40°.

In the embodiments shown, only one local control groove S is provided. It is possible to provide more than one control groove S distributed over the circumference of e.g. the sealing face 20. The control groove end 22b is represented by a line at the constriction, but it may also be rounded between the portions 22a, 22c. The respective control groove may be V-shaped or, alternatively, it may be a rectangular groove.

Figure 6:
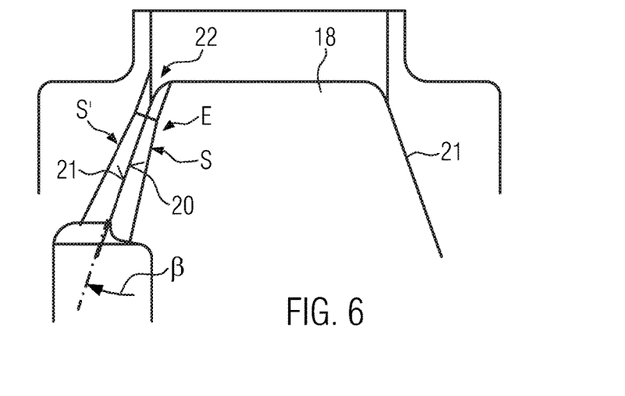
FIG. 6 shows a view similar to that according to FIG. 4, said view representing, however, a detail variant.

As outlined in FIG. 6, the control groove S' may, alternatively, only be provided in the seating area 21. The sealing face 20 would then not comprise any control groove S. As an additional alternative it is, however, outlined in FIG. 6 that both the seating area 21 and the sealing face 20 have provided therein a respective control groove S, S', which, at the closed position, jointly define the constriction E approximately at the center of the length of the passage D. In this case, the two approximately mirror-inverted control grooves S, S' are oriented relative to one another in the circumferential direction. Rotation prevention means are provided for the closure element 18, by way of example.

FIG. 7 shows the steam trap A according to FIGS. 3 to 5 at the open position, adjusted e.g. by the spring 26, which fully displaced the piston 25 to a stop and retracted the closure element 18 from the seat 19 into the chamber 17, so that between the seat 19 and the outlet 13 a large cross-section is opened, e.g. corresponding to the cross-section of the drain valve 10 in FIGS. 1 and 2.

The closed position according to FIG. 3 corresponds to the second discharge state for a small throughput, whereas the open position in FIG. 7 corresponds to a first discharge state for a large throughput (flushing cycle and sterilization cycle).

At the open position in FIG. 7, a strong flow develops, which expands into the valve chamber 17 and to the outlet 13, said strong flow flushing away possible contaminations on the closure element 18, on the seating area 21 or in the control groove S.

Figure 8:
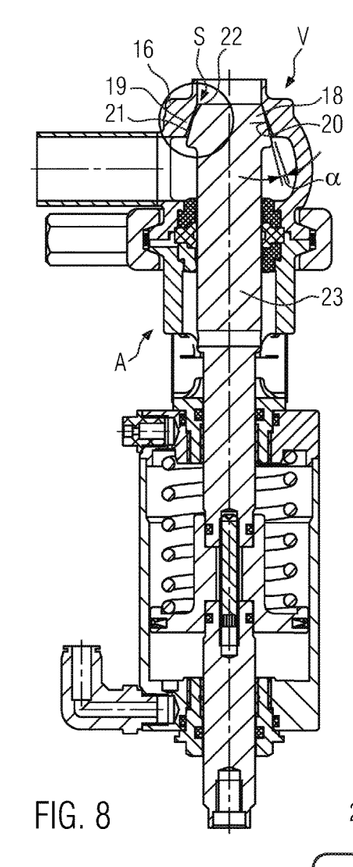
FIG. 8 shows an axial section of a further embodiment of the steam trap, at the closed position.
Figure 9:
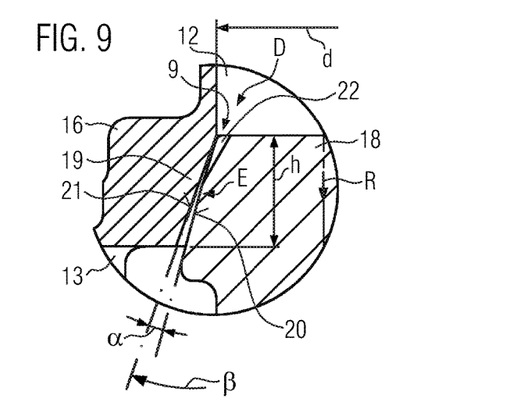
FIG. 9 shows an enlarged detail section related to FIG. 8.

FIGS. 8 and 9 show a different embodiment of the steam trap A at the closed position, said embodiment differing from the embodiment according to FIGS. 3 to 6 insofar as the seating area 21 and the sealing face 20 have different cone top angles. The cone top angle of the conical sealing face 20 is smaller than the cone top angle $\beta$ of the seating area 21 by an angular difference $\alpha$. At the closed position shown in FIGS. 8 and 9, the closure element 18 would produce a sealing effect with a narrow area of the sealing face 20 substantially at the smallest diameter of the seat 19. However, the at least one control groove S, e.g. the milled-out portion 22, is provided e.g. in the sealing face 20, so that the cross-section, which allows a flow to pass, is delimited by the seating area 21, the sealing face 20 and the control groove S and varies in the discharge direction R.

The axial length h of the sealing face 20 and of the seating area 21, respectively, corresponds e.g. approximately to half the smallest seat diameter d. The differential angle $\alpha$ between the cone top angles may have a value from approximately 1° to 10°. The control groove S extends only over a short initial area of the length h and decreases in width and depth in the discharge direction R until it finally merges with the sealing face 20 in the area of the constriction E, where, due to the differential angle $\alpha$, the seating area 21 already receded from the sealing face 20.

Figure 10:
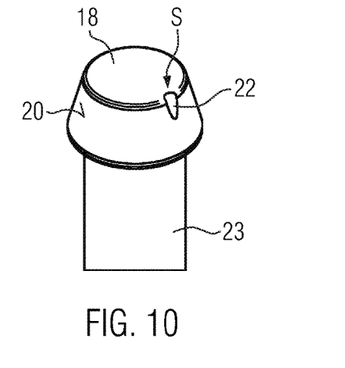
FIG. 10 shows a perspective view related to the detail according to FIG. 9.

FIG. 10 shows in a perspective schematic representation of the closure element 18 the approximately cylindrical milled-out portion 22 in the metallic sealing face 20. The control groove S may alternatively also be formed exclusively in the seating area 21 (not shown).

Figure 11:
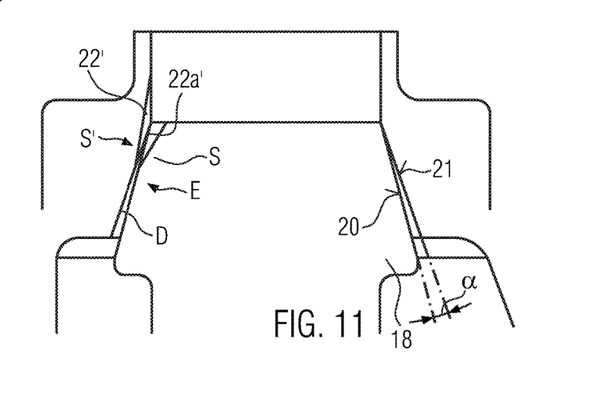
FIG. 11 shows an enlarged detail view, similar to that according to FIG. 8 and FIG. 9, of an embodiment variant.

FIG. 11 shows, as a further alternative, that the two-part passage D is defined by approximately mirror-inverted milled-out portions 22a' and 22', i.e. by two control grooves S, S', which are oriented relative to one another in the circumferential direction and provided in the seating area 21 and in the sealing face 20, and narrows initially, whereupon it enlarges again subsequent to the constriction E. In the embodiment according to FIG. 11, it will be expedient to provide the closure element 18 with rotation prevention means, so that the control grooves S, S' will always be oriented relative to one another in the circumferential direction. Also in the case of the embodiment according to FIGS. 7 to 10, more than one control groove may be provided, distributed in the circumferential direction.

The function of the second embodiment corresponds to that of the first embodiment, i.e. said second embodiment is a steam trap A whose seat valve V has a jet function at the closed position and opens a large cross-section at the open position, the same flow path to the outlet being used for both discharge states (flushing cycle, sterilization cycle).

The steam trap A consists of a small number of components. The seal 24 is not acted upon by any high pressures, it is cost-efficient and requires little maintenance, since the seat valve V is self-cleaning. If, however, the passage D should clog during the sterilization cycle due to product residues or other contaminations, a circumstance which would lead e.g. to a temperature drop in the leakage chamber 9, the seat valve V can temporarily be controlled such that it assumes its open position via a superordinate control by means of the status signal of the temperature detector 11 of the temperature measurement unit, so that the passage D can be flushed intensively and will be cleaned.

The use of the above described steam trap allows e.g. to dispense with the use of a switchover valve and its piping in the product node K, this kind of switchover valves being used in such product nodes for directly discharging the large throughput during the flushing cycle, and for separating the steam trap A as well as for conducting condensate via the steam trap only during the flushing cycle.

The steam trap A can easily be incorporated into existing processes or processing systems, since it has to be acted in the same way as the hitherto used switchover valve, viz. by the actuating unit 14.

For reducing the costs and simplifying the stocking of spare parts, the check valve 8, the drain valve 10 and the seat valve V with its actuating unit 14 may have an at least substantially identical structural design (carry over part philosophy).

Further, a method for operating a steam trap including any one or combination of the features discussed above may comprise, by means of a temperature measurement unit in an inlet of the steam trap, measuring a sterilization temperature, and if the sterilization temperature drops below a given value, transferring the steam trap, for a short period of time, to a first discharge state to enable a large throughput of condensate.

Further, FIGS. 1-11 show the relative positioning of various components of the receiver assembly. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. Furthermore, reference to positioning of an object that is horizontal may refer to positioning where a length of an object is substantially parallel to a plane formed by the ground. Similarly, reference to positioning of an object that is vertical may refer to positioning where a length of an object is substantially perpendicular to a plane that is formed by the ground. Additionally, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:

1. A steam trap for aseptic double seated valves in beverage or food filling plants, wherein the steam trap, on an intake side, is connected to at least one drain valve of a double seated valve and to an outlet, and which includes a seat valve comprising a closure element with a conical sealing face and a seat with a conical seating area, said seat valve being adapted to be switched at least between an open position for a first discharge state with large throughput and a closed position for a second discharge state with small throughput,
wherein at the closed position, the closure element and the seat allow a flow through a passage, said passage having a cross-section, which, in a discharge direction, exhibits an initial inlet, then a constriction and enlarges after said constriction defining a flow-through path which is larger than the constriction, and being delimited by the seating area, the sealing face, and at least one control groove in the sealing face, the seating area, or both.

2. The steam trap according to claim 1, wherein a cone top angle of the seat is an angle of 30° to 60°.

3. The steam trap according to claim 1, wherein an axial length of the sealing face, the seating area, or both corresponds to 50% of a smallest seat diameter.

4. The steam trap according to claim 1, wherein distributed in a circumferential direction, a plurality of control grooves are provided in the sealing face.

5. The steam trap according to claim 1, wherein mirror-inverted control grooves arranged in the sealing face and in the seating area are oriented relative to one another in a circumferential direction.

6. A method of operating the steam trap according to claim 1, comprising:
measuring a sterilization temperature in an inlet of the steam trap, and
if the sterilization temperature drops below a given value, transferring the steam trap, for a short period of time, to the first discharge state for large throughput of condensate.

7. A filling plant for beverages or liquid food, wherein the steam trap according to claim 1 is installed on at least one aseptic double seated valve used in said filling plant.

8. The steam trap according to claim 1, wherein, in the discharge direction, the seat enlarges thus forming a valve chamber which leads to the outlet, and that the closure element is arranged on a linear actuator, which extends through the valve chamber and which is driven pneumatically, electrically, or magnetically, and is adapted to be moved by said linear actuator to the open position from the seat into the valve chamber and to the closed position from the valve chamber into the seat.

9. The steam trap according to claim 8, wherein the linear actuator is a piston rod of a piston, which is adapted to be acted upon by pressurized fluid against a force of a spring, said piston rod being displaceable such that it is sealed off from the valve chamber, and where the spring force biases the piston towards the open position of the seat valve.

10. An aseptic double seated valve in beverage or food filling plants, comprising a condensate bottle which is connected to a steam pipe and, via a check valve, to a housing of the double seated valve, and a drain valve connected to the housing and having connected thereto a steam trap that communicates with an outlet, wherein a flushing cycle is executable in the housing as a first discharge state and a sterilization cycle is executable with steam or steam condensate in the housing as a second discharge state, wherein the steam trap is configured according to claim 1 and wherein, during the flushing cycle, the seat valve is adjustable to the open position and, during the sterilization cycle, to the closed position defined by the passage through which the flow is allowed to pass.

11. The aseptic double seated valve according to claim 10, wherein, in the housing and/or in the discharge path to the seat valve of the steam trap, at detector is installed, and wherein the seat valve is also switched in a temperature-dependent manner between the open and closed positions.

12. The aseptic double seated valve according to claim 10, wherein the double seated valve comprises in the housing a leakage chamber, which has connected thereto the check valve and the drain valve for the purpose of flushing and sterilizing.

13. The aseptic double seated valve according to claim 10, wherein the check valve, the drain valve, and the seat valve of the steam trap are, at least substantially, identical in construction or comprise at least actuating units that are identical in construction.

14. The aseptic double seated valve according to claim 10, wherein the steam trap is installed such that a seat valve axis extends substantially horizontally or vertically.

15. The steam trap according to claim 1, wherein the sealing face and the seating area have either identical cone top angles or wherein the sealing face has a cone top angle that is smaller by 1° to 10° than that of the seating area.

16. The steam trap according to claim 15, wherein, in a case of differing cone top angles, the control groove exhibits the constriction after an initial portion which is directed in a direction opposite to the discharge direction, and wherein the initial portion extends from the intake side in the discharge direction at most over half a length of the sealing face, the seating area, or both.

17. The steam trap according to claim 16, wherein the control groove has at least one conical or cylindrical milled-out portion in the sealing face, the seating area, or both.

18. The steam trap according to claim 15, wherein, in a case of identical cone angles, the control groove extends, in the discharge direction, continuously over a length of the sealing face and/or the seating area, narrows up to a control groove waist at the constriction, or extends cylindrically and re-enlarges from the control groove waist onwards.

19. The steam trap according to claim 18, wherein the control groove has at least one conical or cylindrical milled-out portion in the metallic sealing face and/or the seating area.

* * * * *